No. 645,336. Patented Mar. 13, 1900.
W. F. SHOUP.
CLOD CRUSHER AND PULVERIZER.
(Application filed Dec. 14, 1899.)
(No Model.)
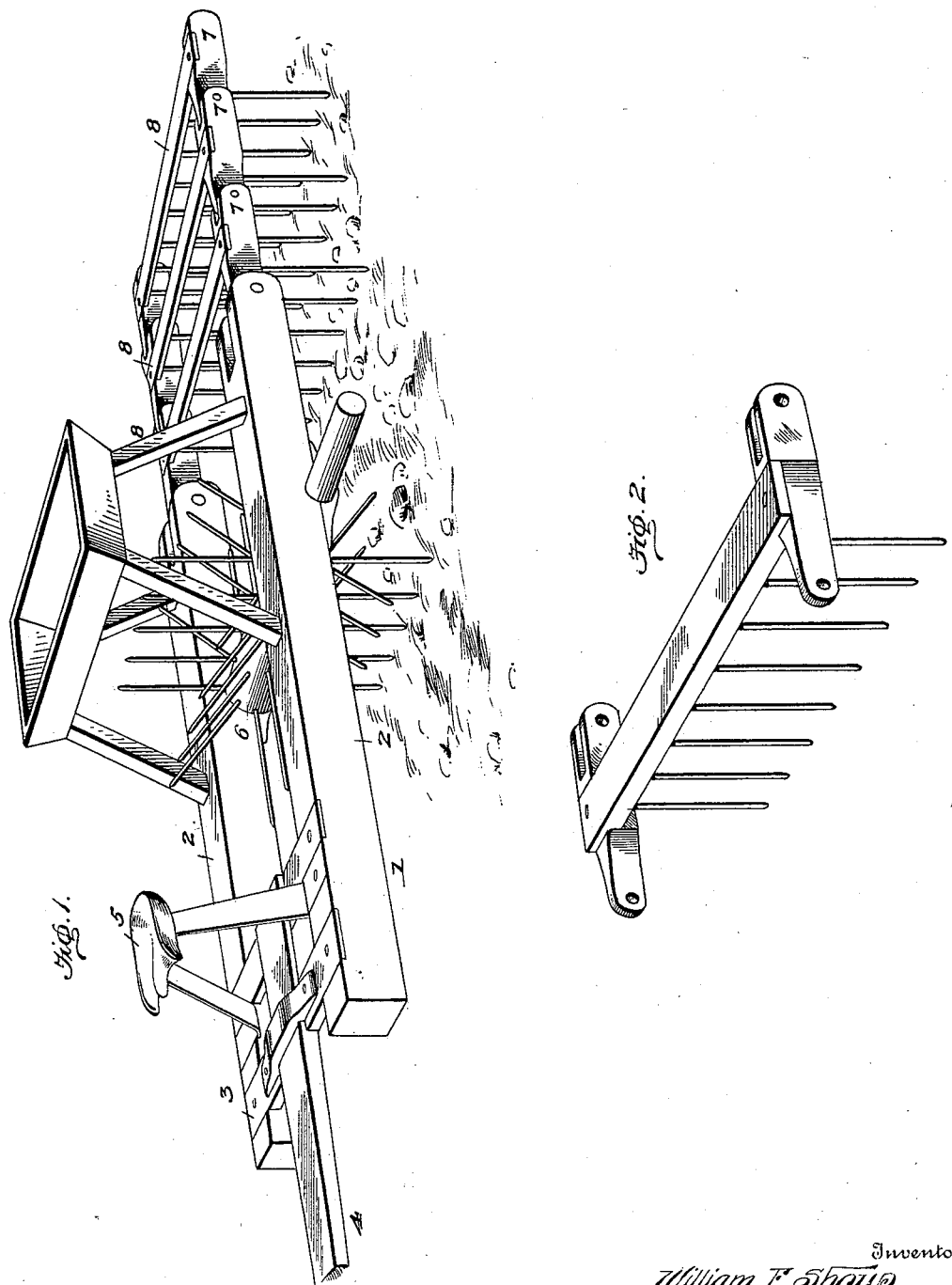

UNITED STATES PATENT OFFICE.

WILLIAM F. SHOUP, OF DERRICK CITY, PENNSYLVANIA, ASSIGNOR OF ONE-HALF TO SETH GURGANIOUS, OF RED ROCK, PENNSYLVANIA.

CLOD CRUSHER AND PULVERIZER.

SPECIFICATION forming part of Letters Patent No. 645,336, dated March 13, 1900.

Application filed December 14, 1899. Serial No. 740,332. (No model.)

*To all whom it may concern:*

Be it known that I, WILLIAM F. SHOUP, a citizen of the United States, residing at Derrick City, in the county of McKean and State of Pennsylvania, have invented certain new and useful Improvements in Clod Crushers and Pulverizers; and I do declare the following to be a full, clear, and exact description of the invention, such as will enable others skilled in the art to which it appertains to make and use the same.

The invention relates to clod crushers and pulverizers.

The object of the invention is to provide a machine of this character which shall be simple of construction, durable in use, and comparatively inexpensive of production and one which will effectively break up the clods and pulverize the same.

To this end the invention consists in certain features of construction and combination of parts, which will be hereinafter fully described and claimed.

In the accompanying drawings, Figure 1 is a perspective view of the machine. Fig. 2 is a similar detail view of one of the drag-shoes.

In the drawings the same reference characters indicate the same parts of the invention.

1 denotes the frame, composed of the side pieces 2 and the cross-piece 3.

4 denotes the draft-pole, and 5 the driver's seat.

Journaled between the side pieces of the frame is a spiked cylinder 6, the spikes of which, as the machine is drawn along, are adapted to penetrate the soil and penetrate and crush the clods or, if working on new ground, to penetrate the ground and lift the soil. The ends of the cylinder are provided with stud-axles to receive wheels, (not shown,) which are used in moving the machine from one field to another.

To the rear ends of the side pieces of the main frame is secured a drag-frame, which is designed to pulverize the soil. This frame consists of a series of drag-shoes 7, pivoted together and connected by spiked bars 8. The sides of each drag-shoe from a point near its rear end taper to its forward end, so as to offer as little resistance to the ground as possible. The rear ends of the shoes are forked to receive the forward ends of the adjacent shoes, which are pivoted in place.

From the foregoing description, taken in connection with the accompanying drawings, the construction, operation, and advantages of my improved clod crusher and pulverizer will be readily appreciated without requiring an extended explanation.

It will be seen that the machine is simple of construction, that said construction permits of its manufacture at small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

In a combined clod crusher and pulverizer, the combination with the main frame and a spiked cylinder arranged therein; of the drag-frame pivoted to the rear end of the main frame and consisting of drag-shoes the rear ends of which are forked and the sides of which are tapered toward the forward ends, said drag-shoes being pivoted together and each set being connected by a cross-piece provided with spikes, substantially as and for the purpose set forth.

In testimony whereof I have hereunto set my hand in presence of two subscribing witnesses.

WILLIAM F. SHOUP.

Witnesses:
FRANK MCALLISTER,
J. G. DREHMER.